United States Patent [19]
Hogarth et al.
[11] Patent Number: 4,950,536
[45] Date of Patent: Aug. 21, 1990

[54] PRESSURE-ACTIVATIBLE LIFT-OFF CORRECTING TAPE

[75] Inventors: Ian Hogarth; Andrew Scott, both of Turriff; Christina Abbott, Aberdeen; Robert I. Wilkinson, Turriff, all of Great Britain

[73] Assignee: Caribonum Limited, Turriff, United Kingdom

[21] Appl. No.: 252,852

[22] Filed: Oct. 3, 1988

[30] Foreign Application Priority Data

Oct. 2, 1987 [DE] Fed. Rep. of Germany ....... 3733394

[51] Int. Cl.[5] .............................................. C09J 7/02

[52] U.S. Cl. .................................... 428/343; 400/696; 428/355; 428/356; 428/913; 428/914

[58] Field of Search ............... 400/696, 346, 355, 356, 400/343, 913, 914

[56] References Cited

U.S. PATENT DOCUMENTS

| | | | |
|---|---|---|---|
| 1,183,424 | 5/1916 | Baldwin | 400/696 |
| 3,664,869 | 5/1972 | Sala et al. | 428/518 X |
| 3,724,633 | 4/1973 | Korb et al. | 400/696 |
| 3,924,728 | 12/1975 | Brown et al. | 428/261 X |
| 3,924,729 | 12/1975 | Flinth et al. | 198/504 |
| 3,956,223 | 5/1976 | Chiang et al. | 428/346 X |
| 4,093,772 | 6/1978 | Taylor et al. | 428/484 X |
| 4,242,402 | 12/1980 | Korpman | 400/696 X |
| 4,289,666 | 9/1981 | Creekmore et al. | 400/696 X |
| 4,289,670 | 9/1981 | Creekmore et al. | 400/696 X |
| 4,384,797 | 5/1983 | Anderson et al. | 400/696 |

FOREIGN PATENT DOCUMENTS 3507939 9/1985 Fed. Rep. of Germany .

*Primary Examiner*—Thomas J. Herbert
*Attorney, Agent, or Firm*—Herbert Dubno

[57] ABSTRACT

A invention relates to a pressure-activatible correcting tape, which has a conventional carrier and a lift-off layer for removing typed or printed type images, the lift-off layer containing a wax, a binder and optionally further additives. This correcting tape is characterized in that the lift-off layer contains approximately 5 to 35% by weight of butyl rubber, approximately 30 to 90% by weight of wax and approximately 0.1 to 5% by weight of a dispersent having a dispersing action in an aqueous medium for the aforementioned substances. The lift-off layer can be produced by means of an aqueous coating liquid, which is environmentally advantageous compared with organic dispersents. This correcting tape can be used without restriction and independently of the type of typewriter.

17 Claims, No Drawings

PRESSURE-ACTIVATIBLE LIFT-OFF CORRECTING TAPE

FIELD OF THE INVENTION

The invention relates to a pressure-activatible correcting tape, which has a conventional carrier and a lift-off layer for removing typed or printed type images, the lift-off layer containing a wax, a binder and optionally further additives, as well as to an aqueous coating liquid for forming the lift-off layer.

THE RELATED ART

U.S. Pat. Nos. 1,183,424 and 3,724,633 discloses processes enabling ereoneous type images to be removed from a typed sheet using adhesive tapes. The adhesive tape is kept spaced from the typed sheet to be corrected. Pressure is then applied through the tape against areas where an erroneous type image appears in order to lift-off the same from the typed sheet when pressure is removed. The correct type image is then printed or typed to replace the image which has been removed. Problems have, however, arisen with such adhesive correcting tapes. Thus, they must be tensioned and transported on special devices, which devices must be installed in the type-writers alongside the usual spools and transporting means for the ribbon. A special typewriter is required. U.S. Pat. No. 3,924,729 describes a correcting element, which carries a latent adhesive coating, which does not feel tacky and does not stick together. However, through the application of pressure, e.g. the striking of types, can be made tacky and DE-OS 28 03 727 describes a pressure-activatible correcting tape, which comprises a flexible, pressure-deformable carrier and a lift-off layer for removing typed or printed type images or the like, the lift-off layer containing a glyconol-amide wax, a binder resin and a plasticizer. These materials are dispersed in organic solvents for forming the lift-off layer. This dispersion is applied to the carrier, followed by drying. Organic solvents in the coating liquid contribute to environmental problems in the workplace. There is therefore a need for a pressure-activatible correcting tape that retains the advantages fo the prior art but does not require any organic solvent in the coating liquid for forming the lift-off layer.

An objective of the present invention was therefore to so further develop the aforementioned pressure-activatible correcting tape that, through the use of suitable starting materials during the production thereof, there is no need for organic solvents in the coating liquid.

SUMMARY OF THE INVENTION

According to the invention this objective is achieved through a lift-off layer comprising (a) approximately 5 to 35% by weight of butyl rubber, (b) approximately 30 to 90% by weight of wax and (c) approximately 0.1 to 5% by weight of dispersant, which is dispersing in an aqueous medium for the above substance.

DETAILED DESCRIPTION

It is of particular significance within the scope of the invention that a butyl rubber and not any random rubber material is contained in the take-off layer. However, the expression "butyl rubber" must not be too closely interpreted. It is in particular a copolymer of isobutylene and butadiene and/or isoprene or the like, the isobutylene proportion preponderating. A material is particularly suitable which contains approximately 95 to 99% isobutylene and approximately 1 to 5% butadiene and/or isoprene. This particular material is commercially available under the abbreviation IIR (Isobutylene-Isoprene-Rubber) (cf. Römpps Chemie Lexikon, 8th edition, 1979, vol. I, p. 547). Aqueous dispersions of the material are the preferable product form. Particularly suitable is the commercially available butyl rubber BL-100 (marketed by Burke Palmason Chemical Company) in the form of an aqueous emulsion with a solids content of approximately 61 to 63% by weight.

Since different typewriter have different specifications e.g. the type striking force, it is advantageous within the scope of the invention to partly replace the butyl rubber by agents compatible therewith, which improve adhesion between a take-off layer and the carrier or give the take-off layer a specific "tackiness" advantageous for the lift-off process.

Advantageous from the standpoint of increasing tackiness is an isoprene rubber (marketed by the Japanese firm Kuraray under the trade name IR-700), which is a latex with a content of approximately 60% by weight of nonvolatile materials. Relative to a dry base, this product can replace butyl rubber in an amount up to approximately 50% by weight, preference being given to the range 15 to 25% by weight. This rubber improves the lift-off characteristics of the correcting tape.

An agent improving the adhesion between lift-off layer and the carrier can in particular be the commercially available product Vinnapas LL-865 (marketed by Wacker Chemicals Limited). This is a dispersion containing approximately 65% by weight of non-volatile material. It aids adhesion between the lift-off layer and the plastic carrier. Relative to the dry base, it can replace the butyl rubber in amounts of generally up to approximately 30% by weight, preference being given to the range approximately 5 to 15% by weight.

A preferred composition of the invention is characterized by; approximately 65 to 75% by weight of butyl rubber, approximately 15 to 25% by weight of isoprene rubber and approximately 5 to 15% by weight of adhesion-improving agent.

Other plastics materials may partly replace the butyl rubber. While it is important that the butyl rubber be present in a considerable amount of within the aforementioned limits, replacement of approximately 20 to 50% by weight can be accepted.

A wax is another necessary component of the lift-off layer of the inventive correcting tape. Waxes are understood to mean a number of natural or synthetically obtained materials, which generally have the following characteristics: kneadable at 20° C., solid to brittle hard, coarse to fine-crystalline, transparent to opaque, but not glassy, melting at over 40° C. without decomposition, relatively low-viscose just above the melting point and not stringy, highly temperature-dependent consistency and solutibility and polishable under slight pressure. The natural waxes include candelilla and carnauba wax, as well as mineral waxes in the form of ceresin and ozocerite. Particularly suitable synthetic waxes are polyethylene waxes, especially low pressure polyethylene, as well oxidized polyethylene waxes. For the purposes of the invention, it is possible to particularly advantageously use a polyethylene wax, which contains approximately 35% by weight of non-volatile components, (marketed by BASF AG under the trademark Poligen WEI). Oxidized polyethylene waxes of low and also high density, as well as maleic acid/propylene and ethylene/acrylic acid copolymers, as well as combinations thereof with oxidized polyethylene waxes are particularly suitable. Waxes or wax-like substances suitable for the invention must assist the lift-off characteristics and reduce the tackiness of the butyl rubber in an amount such that the lift-off layer feels dry and non-tacky to the hand. The necesary adhesiveness is only obtained if a typing error or the like is to be corrected by exerting pressure. The wax is present in the lift-off layer in a quantity of approximately 30 to 90% by weight, especially 45 to 80% by weight.

Incorporation of a dispersant is also important for the inventive correcting tape. Originally this had the function of stabilizing the aqueous dispersion or coating liquid applied to the carrier. However, it has surprisingly been found that the dispersant favours the lift-off effect in the finished product. The given weight percentage range is important, namely approximately 0.1 to 5% by weight, particularly approximately 1 to 3% by weight. On dropping below 0.1% by weight, there is a significant deterioration of the lift-off characteristics. On exceeding the upper value of approximately 5% by weight, there is a delamination of the lift-off layer from the carrier. Within the scope of the invention it is possible to use those dispersing agents, which in the present system lead to a dispersion stabilization, i.e. which dispersion-stabilize the wax and butyl rubber component both before and during the production process and also optionally the further added additives, to which reference will be made hereinafter. The dispersant can be cationic, anionic or nonionic. Preference is given to nonionic dispersants, e.g. a commercially available polyethoxylated oleyl alcohol (marketed under the trademark Volpo 05 by Croda Chemicals Limited), which has a hydroxyl number of 140 to 150 mg KOH/g, an iodine number of 50 to 60 and HLB value of 6.6.

Particular suitability is also attached to sodium salts of polymeric carboxylic acids (marketed under the trademark Tamol 731 by Röhm & Haas), a sodium polymethacrylate (marketed under the trademark Daxad 30S by Grace Organic Chemicals), fluorinated alkyl esters (marketed under the trademark Fluorad FC-431 by 3M) and a sorbitan ester (marketed under the trademark Sorbeth HO55 by Croda Chemicals Limited).

For improving the results obtained with the inventive correcting tape or for attaining additional effects, it is possible to additionally use known, conventional additives, such as e.g. coating aids, antioxidants, fillers, biocides, foam breakers, etc.

The coating aid fulfils various functions. Thus, it prevents the formation of gaps (anti-silicone effect), reduces the tendency to fly off if the carrier is e.g. moved vertically and reduces the sensitivity to air drying at elevated temperature. Particular preference is given to a polyoxyalkylene-dimethyl-polysiloxane copolymer of a nonionic type (marketed in 12% solution under the trademark BYK-306 by Byk Chemie GmbH). If it is used in excessive quantities, then it migrates to the surface of the application and imparts the lift-off characteristics. The coating aid can be present in a quantity of approximately 0.1 to 1.0% by weight, relative to the dry base, in the lift-off layer, but preferably in a quantity of approximately 0.2 to 0.5% by weight. Over roughly respecting the range 0.1 to 0.1% by weight, this coating aid has an overall favourable effect. On exceeding this value, it can lead to a disturbance of the coating system, such as to a coagulation of the butyl rubber contained therein. Other substances which are favourable for the coating are e.g. polymethacrylic acid and copolymers thereof, polyvinyl esters and styrene copolymers, which can also act as foam breakers.

Various products are available as antioxidants, but must not be constituted by a substance migrating into the lift-off layer. 2,2-methylene-bis-4-methyl-6-tertiary-butyl phenol (marketed under the name MBP5T by Societe Francaise d'Organosynthese) in a quantity of approximately 0.2 parts by weight per 100 parts by weight of the inventively essential components (butyl rubber/wax/dispersant) and butyl hydroxytoluene are particularly advantageous. The antioxidant inter alia serves to prevent yellowing of the product.

Improvement of the lift-off effect can be obtained by incorporating preferably up to approximately 10% by weight of fillers or filler combinations, particularly naturally occurring diatomaceous earth (marketed e.g. under the trademark Dicalite LA 3 by Steetly Minerals Limited). This material is ground, dried and air-classified. Average particle diameter is approximately 2.5 to 3.0 micrometers. Other suitable fille are e.g. titanium dioxide, magneium silicate, calcium carbonate, calcinated clays, calcium magnesium carbonate, aluminum hydroxide sulphate and natural and synthetic silicon dioxide. The average particle size of filler materials should not exceed the thickness of the lift-off layer, generally approximately 10 to 25 micrometers. On a dry base, the weight of the coating is approximately 7 to 20 $g/m^2$. Total thickness of the correcting tape is generally approximately 45 to 60 micrometers. However, these values are not critical for the invention.

Since, according to the invention, to the correcting tape carrier is applied an aqueous dispersion as the coating liquid, it can also be advantageous to use biocides, i.e. agents which kill plant and animal life. These can be disinfectants, algicides, fungicides, bactericides, virucides and the like. They can be constituted by 1,2-benzisothiazoline-3-one and lauryldimethyl-benzyl-ammonium chloride. These compounds not only fulfil their biocidal function in the aqueous coating liquid, but also in the finished product. Formaldehyde can also be used as a biocide, said action mainly extending to the liquid coating agent.

It is advantageous for a favourable application of the aqueous coating liquid to use a foam breaker, i.e. a substance forming at the liquid-gaseous interface a closed film. Antiforms enable the medium to be degassed to form in a very short time and accompanied by the destruction of the gas bubbles, to form a very small surface therefore achieving the lowest energy state. Preference is given to the use of a combination of mineral oil, silicone, fatty oil, ELPO copolymer and polyethylene glycol esters (marketed under the trademark Foamaster AP by Diamond Shamrock Process Chemical Limited). Similar products are also commercially available (under the designations Foamaster VL and NS, as well as Bevaloid 681F and 691 by Bevaloid Chemicals). Pure silicone foam breakers should not be used, because the silicone migrates into the lift-off layer and can appear at the surface, which can significantly impair the lift-off characteristics.

The aforementioned materials are brought into an aqueous medium for producing the inventive correcting tape. Solids content of this aqueous medium, which excludes organic solvents, is not decisive. An excessively low solids content should be avoided, because then a high energy expenditure is required during the subsequent drying. Solids content to the aqueous coating liquid should be approximately 20 to 65 and in particular 40 to 60% by weight. Application takes place by conventional processes, e.g. using a doctor blade or an air knife coater. The aqueous coating liquid can be applied to random flexible carriers suitable for correcting tapes, such as e.g. to paper or to a plastic film, particular preference being given to polyethylene, terephthalate, polyester, polyethylene, polypropylene, cellulose acetate, nylon and the like. Generally the carrier has a diameter of approximately 15 to 50 and preferably approximately 30 to 40 micrometers. Following the application of the aqueous coating liquid, the coated carrier is passed through a dryer and dried at elevated temperature. Drying temperature is dependent on various factors, such as e.g. the carrier feed speed and the thickness of the coating liquid applied. It generally varies between approximately 40° and 100° C., preference being given to the range 70° to 90° C.

The invention leads to numerous advantages. First it has been possible now to produce a properly functioning correcting tape with an aqueous coating liquid, which has cost advantages compared with solvent systems. Moreover, the inventive correcting tape can be used with virtually all types of typewriter. No longer is there any need to adapt to the particular machine system type, which does not apply to many known commercial products. Thus, the inventive correcting tape can be used both for typewriters with high and with low impact energy. During operation the tape also has good structural stability, i.e., the lift-off layer does not become delaminated. When the invention composition is placed on a sheet rather than on a correcting tape, it can be used in projectors. The symbols, optionally in colour, are impressed or imprinted on the lift-off layer and, unlike in the known projection sheets or foils, are not smeared by carelessness. Thus, the written characters and the like are durably and securely fixed.

The invention is described in greater detail hereinafter relative to various formulation examples, the figures relating to the dry weight and constituting percentage by weight. Thus, these formulations give information on the specific weigh percentage composition of the lift-off layer.

| Example | 1 | 2 | 3 |
|---|---|---|---|
| Butyl rubber (BL 100) | 23.38 | 18.96 | 23.37 |
| Isoprene rubber (IR-700) | — | 5.58 | — |
| Vinyl acetate/ethylene copolymer (Vinnapas LL 865) | — | 2.34 | — |
| Polyethoxylated oleyl alcohol (Volpo 05) | 1.96 | 1.87 | 1.96 |
| Wax (Poligen W.E.I) | 57.78 | 55.20 | 72.23 |
| Foam breaker (mineral oil, silicone, fatty oil, ELPO copolymer, polyethylene glycol ester) (Foamaster AP) | 1.44 | 1.37 | 1.44 |
| Diatomaceous earth (Dicalite SA 3) | 14.44 | 13.78 | — |
| Polyoxyalkylene-dimethyl-polysiloxane copolymer (Byk 306) | 0.24 | 0.24 | 0.25 |
| 2,2-methylene-bis-4-methyl-6-tertiary butyl phenol | 0.47 | 0.44 | 0.46 |
| 1,2-benzisothiazoline-3-one | 0.29 | 0.23 | 0.29 |

| Example | 4 | 5 | 6 |
|---|---|---|---|
| Butyl rubber (BL 100) | 21.80 | 23.98 | 20.22 |
| Vinyl acetate/ethylene copolymer (Vinnapas LL 865) | 2.30 | — | — |
| Fluorinated alkyl ester (Fluorad FC 129) | 2.45 | — | — |
| (Fluorad FC 430) | — | 0.07 | — |
| Polyethoxylated oleyl alcohol (Volpo 05) | — | — | 1.89 |
| Wax (Poligen W.E.I) | 55.70 | — | — |
| Wax (Aquacer 531) | — | 59.10 | — |
| Wax (Hordamer PEo3) | — | — | 61.97 |
| Diatomaceous earth (Dicalite SA3) | 15.40 | — | — |
| Aluminium hydroxide 500 | — | 14.50 | — |
| China Clay B | — | — | 13.55 |
| 2,2-methylene-bis-4-methyl-6-tertiary butyl phenol (MBPST) | 0.45 | 0.47 | 0.46 |
| Foam breaker (mineral oil, silicone, fatty oil, ELPO copolymer, polyethylene glycol ester) (Foamaster AP) | 1.40 | 1.40 | 1.46 |
| Polyoxyalkylene-dimethyl-polysiloxane copolymer (Byk 306) | 0.26 | 0.24 | 0.25 |
| 1,2-benzisothiazoline-3-one | 0.24 | 0.29 | 0.24 |

We claim:

1. Pressure-activatible correcting tape having a conventional carrier and a lift-off layer for removing images, the lift-off layer comprising:
   - approximately 5 to 35% by weight of butyl rubber;
   - approximately 30 to 90% by weight of wax; and
   - approximately 0.1 to 5% by weight of a dispersant selected from the group consisting of a cationic, anionic and nonionic agent; and
   - wherein said lift-off layer is first formed by dispersing said butyl rubber, wax and dispersant in an aqueous medium.

2. Correcting tape according to claim 1, wherein the butyl rubber is a copolymer of 95 to 99% isobutylene and 1 to 5% of a monomer selected from the group consisting of butadiene, isoprene and mixtures thereof.

3. Correcting tape according to claim 1, wherein a coating aid in the form of a polyoxyalkylene-dimethylpolysiloxane copolymer is incorporated into the lift-off layer.

4. Correcting tape according to claim 1, wherein a foam breaker is incorporated into the lift-off layer.

5. Correcting tape according to claim 1, wherein as a finely divided filler, diatomaceous earth is incorporated into the lift-off layer.

6. Correcting tape according to claim 1, wherein a biocide is incorporated into the lift-off layer.

7. Correcting tape according to claim 1, wherein the butyl rubber is partly replaced by a tackiness-imparting component.

8. Correcting tape according to claim 1, wherein the butyl rubber is replaced in a proportion of up to approximately 50% by weight by the tackiness-imparting component.

9. Correcting tape according to claim 1, wherein the butyl rubber is partly replaced by an adhesion-improving agent, which improves the adhesion between the lift-off layer and the carrier.

10. Correcting tape according to claim 9, wherein the adhesion-improving agent replaces the butyl rubber in an amount up to approximately 30%.

11. Correcting tape according to claim 9 wherein the butyl rubber is partly replaced by a vinyl acetate/ethylene copolymer.

12. Correcting tape according to claim 9, wherein there are approximately 15 to 25 parts by weight of isoprene rubber and approximately 5 to 15 parts by weight of the adhesion-improving agent for approximately 60 to 80 parts by weight of the butyl rubber.

13. Correcting tape according to claim 12, wherein there are approximately 19 to 23 parts by weight of isoprene rubber and approximately 7 to 10 parts by weight of the adhesion-improving agent for approximately 68 to 74 parts by weight of butyl rubber.

14. Correcting tape according to claim 1, wherein the dispersant is nonionic.

15. Correcting tape according to claim 14, wherein the nonionic dispersant is a polyethoxylated oleyl alcohol.

16. Correcting tape according to claim 1, wherein an antioxidant is incorporated into the lift-off layer.

17. Correcting tape according to claim 16 wherein the antioxidant is 2,2-methylene-bis-4-methyl-6-tertiary butyl phenol.

* * * * *